Dec. 24, 1935.        A. E. SMITH        2,025,219
HYPODERMIC SYRINGE
Filed March 25, 1927
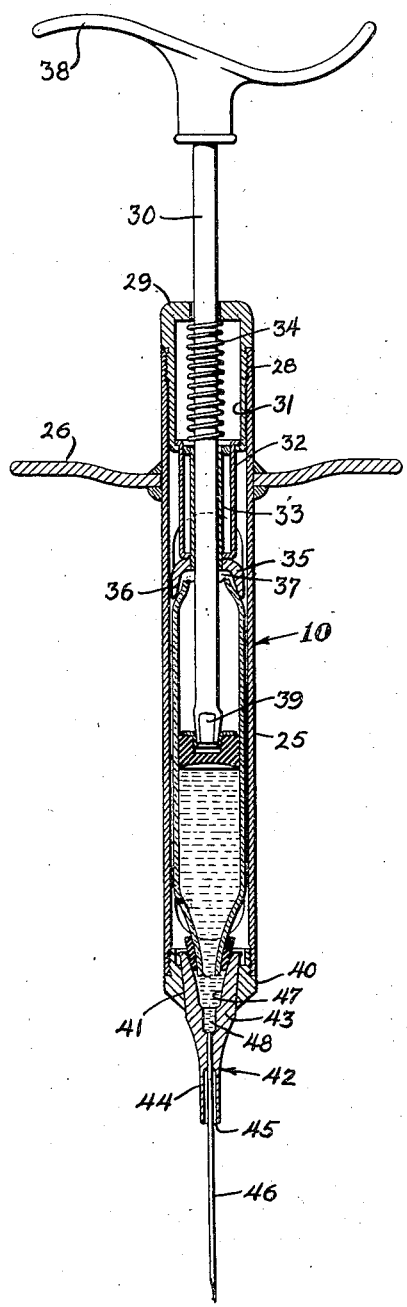
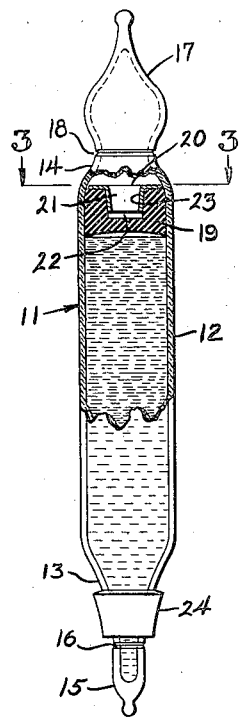
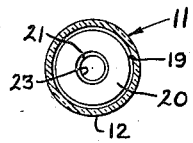
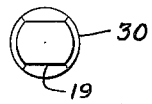
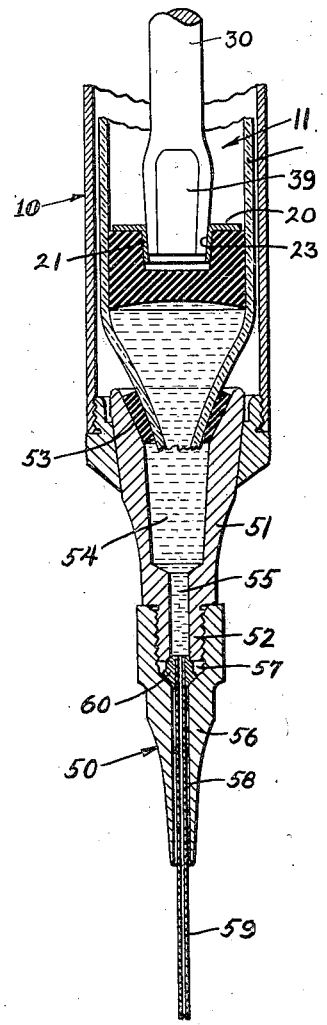
INVENTOR.
ARTHUR E. SMITH
BY
ATTORNEY.

Patented Dec. 24, 1935

2,025,219

UNITED STATES PATENT OFFICE 2,025,219

HYPODERMIC SYRINGE

Arthur E. Smith, Los Angeles, Calif.

Application March 25, 1927, Serial No. 178,389

9 Claims. (Cl. 128—218)

This invention relates to hypodermic syringes.

The general object of this invention is to provide an improved hypodermic syringe which is adapted to receive an ampule for injection of the drug in the ampule.

Another object of the invention is to provide a syringe having novel means for removably holding an ampule therein.

A further object of my invention is to provide a novel hypodermic needle for a syringe.

An additional object of my invention is to provide novel means for attaching a needle to a syringe.

A still further object of my invention is to provide an improved drug holding ampule.

Other objects and advantages of the invention will be apparent from the following description taken in connection with the accompanying drawing wherein:

Fig. 1 is a central longitudinal section of my improved syringe showing an ampule, the contents of which have been partly ejected.

Fig. 2 is an enlarged elevation partly in section of my improved ampule.

Fig. 3 is a section taken on line 3—3 of Fig. 2.

Fig. 4 is an enlarged end view of the plunger rod and

Fig. 5 is an enlarged fragmentary central longitudinal section of the discharge end of my improved syringe showing a modified form of hypodermic needle attached thereto.

In the accompanying drawing I have indicated my improved syringe generally at 10. This syringe is particularly designed for use with an ampule 11, shown in detail in Fig. 2.

The ampule 11 is preferably made of a good grade of glass and comprises a body 12 having tapered end portions 13 and 14. The tapered end portion 13 is closed and terminates in a breakable tip 15. The tip 15 may be rendered readily separable from the ampule by scoring, notching, etching, or otherwise weakening it as indicated at 16.

Within the ampule body 12 and adjacent the end portion 14 I provide a stopper 19 which is preferably of rubber and which fits the ampule tightly, enabling it to act as a piston to expel the contents of the ampule through the tapered end 13 after the tip 15 has been broken therefrom.

The ampule may be of various sizes and is preferably of a size to hold the amount of drug necessary for one injection. The stopper 19 is preferably provided as shown in the drawing, with a washer or engaging member 20 having thereon a hub 21 which may be tapered and which is adapted to fit in a recess 22 of the stopper. The hub 21 includes a tapered aperture 23. The stopper 19 is preferably of a greater diameter normally than the inside diameter of the body 12 of the ampule. When assembling the completed ampule the stopper 19 is positioned in the ampule in a compressed state, and retained in a compressed state to form a hermetic seal between itself and the ampule.

The tapered end portion 13 of the ampule is provided with a resilient collar 24, the lower end of which is spaced just above the weakened portion 16 as shown. This collar 24 is preferably made of a good grade of rubber.

To prepare the ampule 11 for use in the syringe the tip 15 is separated from the ampule at 16 and the tip 17 is separated from the ampule at 18.

The syringe 10 comprises a body or barrel 25 having a cross bar 26 provided intermediate its length for engagement by the fingers of an operator. The upper end of the barrel is threaded as at 28 for detachably engaging a cap 29 which is likewise threaded.

The cap 29 includes a plunger rod 30 for engaging and moving the stopper 19 of the ampule 11. The cap 29 also includes a plurality of telescopic tubular members 31, 32, and 33, which may be of any desired number. A spring 34 is located within these telescopic members and bears between the under side of the top of the cap and the upper end portion of the lower or innermost telescopic member 33. The lower telescopic member is provided with a head 35, which is provided in its under surface with a beveled flange 36 to form a recess 37.

The plunger rod 30 is fitted within the spring 34 and has a cross bar or handle 38 upon its end. This handle 38 is adapted to be engaged by the palm of an operator's hand. The lower end of the plunger rod 30 is flattened and tapered as at 39, to fit the tapered recess 21 of the washer 20 of the stopper 19 in ampule 11. The flattening of the tapered end 39 of the plunger rod slightly enlarges it so that it cannot be pulled out through the telescopic members.

The lower end of the syringe body or barrel 25 is internally threaded for detachably securing thereto a tip 40 which is similarly threaded and provided with a tapered aperture 41. This tip 40 is adapted to support a hypodermic needle indicated generally at 42.

The hypodermic needle 42 includes a body portion 43 externally tapered to correspond to the taper of the aperture 41 in the tip 40. The body portion 43 terminates in a reduced end portion 44 which is provided with a recess 45 of slightly greater diameter than the outside diameter of a hollow needle 46 which is secured in the body as by soldering or in any other suitable manner. The side walls of the recess 45 form a needle guard which will, if the needle 46 is accidently bent, tend to lengthen the arc of the needle bend and thus prevent it from readily breaking at its juncture with the solid portion of the body. The upper end of the body 43 is provided with a recess 47 having tapered side walls and communicating through the medium of another recess 48 with the cavity in the hollow needle 46.

When it is desired to use my improved syringe 10 for making an injection the cap 29 is removed from the body 25 and an ampule 11 is inserted into the barrel of the syringe, the tips 15 and 17 of the ampule having been previously removed. The ampule 11 is moved downwardly in the syringe until the collar 24 of the reduced end portion 13 seats within the tapered recess 47 of the hypodermic needle body 43 as clearly shown in Fig. 1.

After the ampule 11 has been placed in the syringe the cap 29 is secured to the body of the syringe. When the cap 29 is placed in position the flange 36 of the head 35 on the lower telescopic member 33 abuts the curved portion of the upper end of the ampule (see Fig. 1) and causes the ampule to be correctly centered within the barrel. The operator then grasps the cross bar 26 with his fingers and places the handle 38 in the palm of his hand and moves the handle towards the cross bar. As the handle 38 is moved toward the cross bar the tapered end 39 of the plunger rod 30 centers the tapered recess 21 of the washer on the ampule stopper 19. This recess prevents tipping of the stopper 19. Upon a further movement of the plunger rod the ampule stopper 19 will be forced towards the tapered end 13 of the ampule. In this manner the stopper 19 is caused to act as a piston to expel the contents of the ampule through the broken off tip into the hypodermic needle 42, through which it will be delivered for injection.

As pressure is applied on the plunger rod 30 to move the stopper 19 downwardly, the resilient collar 24 of the ampule is held in tight engagement with the tapered side walls of the recess 47 of the hypodermic needle body 43, thus creating a fluid tight seal between the ampule and the syringe. Consequently the more pressure that is required to move the stopper the tighter the seal between the ampule and the syringe.

With my improved type of hypodermic needle indicated at 42 in the drawing there is no possible chance of the hypodermic needle becoming detached from the syringe during an operation, while it may be readily removed from the syringe for sterilization or for insertion of a different size needle.

In Fig. 5 I have shown and indicated at 50 a modified form of hypodermic needle which is adapted to fit the tip 40 of my improved syringe 10. The hypodermic needle 50 comprises a body portion 51, a portion of the side walls of which are tapered to correspond to the taper of the side walls of the aperture 41 of the tip 40. The body portion 51 terminates in a reduced externally threaded end 52 and is provided with a conical recess 53 terminating at its apex end in a recess 54 which communicates with a reduced aperture 55. A hub 56 having therein a threaded recess 57 which terminates in a conical bottom and communicates with an aperture 58, is adapted to be detachably secured to the reduced end 52 of the body 51. The hub 56 is adapted to retain a hollow needle 59 in contact with the reduced end 52 of the body 51 so that the aperture 55 of the body portion may communicate with the passageway in the needle 59. The needle 59 is provided with an enlarged head 60 the lower side of which is conical and is adapted to be positioned in the conical bottom of the threaded recess 57 of the hub 56.

The needle head 60 is preferably made of a relatively soft metal such as lead and is adapted to be drawn into tight engagement with the lower end of the reduced tip 52 of the body portion 51 by the hub 56, as shown in the drawing, the relatively soft metal of the head forming a fluid tight seal between itself and the various other elements.

The aperture 58 in the hub 56 is preferably of a slightly greater diameter than the external diameter of the needle 59 to allow the needle to have restricted lateral movement, so that in case of accidental bending of the needle 59 the arc of the bend will be lengthened thus preventing the needle 59 from breaking at the juncture with the head 60.

From the foregoing description it will be apparent that I have provided an improved type of syringe and ampule wherein novel means is provided for centering and holding the ampule, wherein an improved means is provided for discharging the contents of the ampule, and wherein a novel form of hypodermic needle and means for attaching the hypodermic needle is provided.

What I claim is:

1. A syringe including a hollow body, a cap detachably secured to said body, a tip adjacent the other end of said body, said tip including a conical aperture, a hypodermic needle on said tip, said hypodermic needle including a body portion and a needle portion, a tapered recess in said hypodermic needle body, said recess communicating with the hollow interior of said hollow needle, an ampule in said syringe body, a stopper in said ampule, one end of said ampule being tapered, a resilient collar on the tapered end of said ampule, said resilient collar adapted to engage said previously mentioned tapered recess in said hypodermic needle body to form a fluid tight seal between said ampule and said hypodermic needle body.

2. A syringe including a hollow body, a closure on said body, an ampule in said previously mentioned syringe body, said ampule being constricted adjacent one end, a stopper in said ampule, a plunger associated with said hollow body and adapted to enter said ampule body through said constricted portion and engage said ampule stopper, said plunger being movable to move said stopper in said ampule to cause said stopper to act as a piston to expel the contents of said ampule, and means in said hollow body adapted to engage said ampule adjacent said constriction to hold said ampule in said hollow body independent of the thrust of said plunger.

3. A syringe including a hollow body, a cap detachably secured to one end of said body, means adacent the other end of said body for detachably holding a hypodermic needle, an ampule in said body, said ampule being constricted adjacent one end, a stopper in said ampule, means at the opposite end of said ampule coacting with means on said hypodermic needle for forming a fluid tight joint between said ampule and said hypodermic needle, a plunger mounted in said cap and movable therein and in said body, said plunger adapted to enter said ampule through said constriction and engage said stopper, and means supported by said cap for engaging said ampule adjacent said constriction to hold said ampule in place in said syringe independently of the thrust of said plunger.

4. A syringe including a hollow body, a cap detachably secured to said body, a tip adjacent the other end of said body, said tip having a conical aperture, a hypodermic needle adapted to be supported by said tip, said hypodermic needle including a body portion having a conical shaped outer surface, said conically shaped portion of said hypodermic needle body being adapted to engage the surface of said conical aperture in said tip, a hollow needle secured in said hypodermic needle body and said hypodermic needle body having an extension integral therewith spaced from said hollow needle and surrounding said needle, a tapered recess in said hypodermic needle body, said recess communicating with the hollow interior of said hollow needle, an ampule in said syringe body, said ampule being constricted adjacent one end, a stopper in said ampule, the opposite end of said ampule being tapered, a resilient collar on said tapered end of said ampule, said resilient collar adapted to engage said tapered recess in said hypodermic needle body to form a fluid tight seal between said ampule and said hypodermic needle body, a plunger mounted in said previously mentioned cap, said plunger being adapted to enter said ampule body through said constricted portion and engage said ampule stopper, said plunger being adapted to move said stopper in said ampule to cause said stopper to act as a piston to expel the contents of said ampule out through said hollow needle and means supported by said previously mentioned cap adapted to engage said ampule adjacent said constriction to hold said ampule in said hollow body independent of the thrust of said plunger.

5. A syringe including a hollow body, a cap detachably secured on one end of said body, a tip adjacent the other end of said body, said tip having an aperture therein, a hollow hypodermic needle supported by said tip, said hypodermic needle including a body portion, the body portion of said hypodermic needle being positioned in said aperture in said tip, an ampule in said syringe body, said ampule being constricted adjacent one end, a stopper in said ampule, the opposite end of said ampule being tapered, a resilient collar on said tapered end of said ampule, said resilient collar engaging said tapered recess in said hypodermic needle body to form a fluid tight seal between said ampule and said hypodermic needle body, a plunger mounted in said cap, said plunger being adapted to enter said ampule body through said constricted portion and to engage said ampule stopper, said plunger being adapted to move said stopper in said ampule to cause said stopper to act as a piston to expel the contents of said ampule through said hollow needle.

6. In a syringe, a cartridge frame adapted to contain a cartridge, and a spring-pressed follower adapted to seat against the adjacent end of a cartridge in said frame, said follower having a flaringly recessed end effective in the seating action of the follower automatically to center the cartridge in the frame.

7. In a syringe, a barrel, a closure for one end of said barrel, said closure having a tapered cavity therein, a hypodermic needle, said needle including a hollow body part having a tapered inner surface and a tapered outer surface thereon corresponding to the surface of said conical cavity so that the body part of said needle engages said closure in fluid tight manner, an ampule in said body, said ampule including an end tapered to correspond to the taper of said hollow body and fitting in said hollow body.

8. In a syringe adapted to receive an ampule, a barrel, a cap for one end of said barrel, a tip removably secured to said cap, said tip having a tapered recess and an aperture extending from said tapered recess, an ampule in said barrel, said ampule being constricted at one end, a resilient collar on said ampule, said resilient collar being positioned in said recess of said tip to form a fluid tight seal between said ampule and the syringe.

9. In a syringe adapted to receive an ampule, a barrel, a cap for one end of said barrel, said cap having an aperture therein, a tip removably secured in said aperture, said tip having a part fitted within said cap and a part projecting from the cap, said tip including a recess to receive and support said ampule and an aperture extending therethrough, said tip including a portion for engaging a hypodermic needle.

ARTHUR E. SMITH.